(12) United States Patent
Aasheim et al.

(10) Patent No.: US 12,315,258 B2
(45) Date of Patent: May 27, 2025

(54) SYSTEM AND METHOD FOR IDENTIFYING MOMENT OF SNAP WITHIN VIDEO OF AMERICAN FOOTBALL

(71) Applicants: Jered Donald Aasheim, Eugene, OR (US); Ethan John Aasheim, Eugene, OR (US)

(72) Inventors: Jered Donald Aasheim, Eugene, OR (US); Ethan John Aasheim, Eugene, OR (US)

(73) Assignee: Jered Donald Aasheim, Eugene, OR (US)

( * ) Notice: Subject to any disclaimer, the term of this patent is extended or adjusted under 35 U.S.C. 154(b) by 351 days.

(21) Appl. No.: 18/079,242

(22) Filed: Dec. 12, 2022

(65) Prior Publication Data

US 2023/0215175 A1 Jul. 6, 2023

Related U.S. Application Data

(60) Provisional application No. 63/295,870, filed on Jan. 1, 2022.

(51) Int. Cl.
*G06V 10/82* (2022.01)
*G06V 20/40* (2022.01)

(52) U.S. Cl.
CPC .............. *G06V 20/46* (2022.01); *G06V 10/82* (2022.01); *G06V 20/42* (2022.01)

(58) Field of Classification Search
None
See application file for complete search history.

(56) References Cited

U.S. PATENT DOCUMENTS

| 11,023,303 | B2 * | 6/2021 | Alonso | G06K 7/10366 |
| 2017/0043260 | A1 * | 2/2017 | Austerlade | G06Q 50/20 |
| 2018/0247561 | A1 * | 8/2018 | Buck | G09B 19/0038 |

FOREIGN PATENT DOCUMENTS

WO WO-2023064563 A1 * 4/2023 ............. G06N 10/20

\* cited by examiner

*Primary Examiner* — Idowu O Osifade

(57) ABSTRACT

Systems and methods for identifying a moment of snap within video are disclosed. Exemplary implementations may: train a neural network to detect one or more essential offensive formation element; identify, using the neural network, one or more essential offensive formation element within input video; determine, using the identified one or more essential offensive formation element, one or more video frame including a valid formation; and determine, using the detected one or more essential offensive formation element, one or more video frame in which the valid formation disbands.

23 Claims, 13 Drawing Sheets

SYSTEM AND METHOD FOR IDENTIFYING MOMENT OF SNAP WITHIN VIDEO OF AMERICAN FOOTBALL

This application claims priority to and the benefit of U.S. Provisional Application Ser. No. 63/295,870, entitled "SYSTEM AND METHOD FOR IDENTIFYING MOMENT OF SNAP WITHIN VIDEO OF AMERICAN FOOTBALL", filed Jan. 1, 2022, which is hereby incorporated by reference in its entirety.

FIELD OF THE INVENTION

This invention relates to video analysis for the sport of American football (as opposed international football which is also commonly referred to within the United States as "soccer"). Particularly, this invention relates to the analysis of video footage of American football to identify the Moment of Snap (MOS) for when the Offensive team "snaps" the ball to begin the play. More particularly, the invention relates to a method and system for the use of object detection in the video frames to identify when the MOS occurred. Specifically, the invention relates to a novel technique for employing deep learning models to recognize existing parts of the Offensive formation to identify the window of frames for when the offense forms and then eventually disbands signifying the play has started, thereby delivering a high-quality prediction for the Moment of Snap. Using this technique, the resulting MOS for a play can be automatically "snapshotted" from the video and the final pre-snap Offensive formations and alignments identified-a crucial element of play analysis in American football. This invention is applicable to any type of field of play used in American football whether this be at the high school, college (e.g., NCAA), or professional level of competition (e.g., NFL, CFL, European football, etc.).

BACKGROUND OF THE INVENTION

American football is often described as "a game of inches" because of the importance of the location of the ball during course of the game. Teams strategize and create game plans for how their offenses can best move the ball the length of the field of play into the "end zone" and score points or how to defensively stop their opponent from doing the same. The relatively few numbers of plays in a game (~100 plays is common) results in the margin for error also being relatively low which increases the importance of game planning and preparation.

To create these game plans and strategies, recorded video of opponent play is often analyzed by human experts knowledgeable of the subject matter-specifically coaches-who watch the footage and manually annotate events within the video. Example annotations include the positions and alignments of the Offensive players before the MOS (commonly referred to as the "formation"), whether players moved from one location to another before the MOS (commonly referred to as "motion"), how quickly an Offensive team starts the play after they are in formation, etc. This method of annotating video is time consuming and error prone as many of the observations are subject to human judgment. For example, the determination for whether the Offense is operating a "hurry up" strategy is subject to the observer's opinion: one person may state the Offense is running hurry up whereas another person may decide this isn't the case. Even if "hurry up" is quantified as the MOS being less than 10 seconds from the start of the play clock start, the frame number in the video for when the MOS occurred is relegated to the annotator to decide. Without a consistent process for identifying the MOS, these judgments are entirely yielded to the human annotator which introduces undesirable variation in the captured data and the follow-on analytics derived from these assembled datasets.

Another key challenge affecting video annotation is variation within the video itself. Football play is captured with differing levels of video quality, from different vantage points and angles, under a range of lighting conditions, with a wide range of range of zooming and panning, etc. As a result, even when human subjectivity is minimized (i.e., having the same person annotate multiple videos) this variation across video footage can affect the consistency of the annotations.

It is apparent that a need exists for a technique that can eliminate the inconsistency in annotating football video, that is robust to the variation introduced during video capture, and resilient to the error introduced from human subjectivity. The present invention is directed toward providing such a technique.

It is an object of the present invention to provide a method and system for automatically capturing annotations from video of American football. It is also an object of the present invention to deliver robustness against the aforementioned video quality variations which affect the quality of the captured annotations. Another object of the present invention is to eliminate human subjectivity that is typically introduced when capturing these annotations. Still a further object of the present invention is to provide a system for capturing these annotations in a fully automated and scalable manner which does not rely upon human effort, thereby saving labor, time, and ultimately cost. These and other objects of the invention will be apparent to those skilled in the art from the description that follows.

SUMMARY

The method and the system of this invention center around the innovative concept of using deep learning for object detection to recognize existing elements of an Offensive formation within the video footage to identify the window of frames for when the offense forms and then eventually disbands signifying the play has started, thereby delivering a high-quality prediction for the Moment of Snap. In American football, teams must align in a "formation" using a well-defined set of rules such as: there can be up to eleven players on the field for a given play, there must be seven players on the line of scrimmage, a specific player called the Center "snaps" the ball to a backfield player to begin the play, nearly all players must be stationary when the ball is snapped (often referred to as the Moment of Snap), and eligible receivers may move from one location to another location on their side of the line of scrimmage (commonly referred to as "motion") before the Moment of Snap occurs. Receiver motions can be quite exotic but in most leagues a constraint is that only one player may be moving just before the Center snaps the ball; all other Offensive players must be stationary. Consequently, receiver motion often introduces unique challenges for determining the MOS.

Camera panning and zooming introduces one of the most difficult challenges for accurately determining the Moment of Snap. Consider a conventional approach: a system could use object detection to identify each of the players in the video frame and then employ multiple object tracking (MOT) to track the movement of these players and when the total movement of the players exceeds some predefined threshold this frame is as the Moment of Snap. Camera panning and zooming, however, will often generate false positives and a resulting inaccurate Moment of Snap. When a camera zooms or pans, the absolute locations of all the players within the video frame will change because these objects are located within a pixel-based coordinate system (sometimes called "pixel space"). The result: all players have different locations within the consecutive video frames which the system will inaccurately recognize as movement—thereby suggesting an inaccurate Moment of Snap.

To resolve these challenges, the present invention advances the art by leveraging deep learning for object detection to recognize existing parts of an Offensive formation within the video footage to identify the window of frames for when the offense forms and then eventually disbands, thereby signifying the play has started. This estimation model for the MOS is kept in memory and reconstructed every N frames to account for receiver motion as well camera panning and zooming. In some aspects, N=1. In some aspects, N is less than 1. This is an important consideration because the video quality varies based upon the camera equipment used, camera operator, lighting conditions, degree of camera panning and zooming, etc. so it is not sufficient to only construct the MOS estimation once—it must be repeatedly reconstructed before the play begins.

To construct the MOS model, the present invention advances the art by using the aforementioned Offensive formation rules to recognize key parts of an Offensive formation and, importantly, record the frames when these objects are no longer recognized within the video. To enable this capability, the system employs deep learning to train a neural network which can detect key components of an Offensive formation-namely the Center player, the Offensive Lineman, and the Backfield players. Thousands of images of football fields from different camera angles, lighting conditions, perspectives, etc. were obtained and these parts of Offensive formations were annotated by human experts. These annotations were then used to train a neural network and produce a generalized model which can then identify these same type of Offensive formation elements in otherwise unseen video footage that is processed by the system.

With the ability to detect these known Offensive formation objects, the system then constructs a MOS model by analyzing every frame in the video to determine when the Offensive players align themselves into a formation and, importantly, when this formation of players has disbanded because the play has started. The frame in the video when the formation has disbanded is then defined as the candidate Moment of Snap. Lastly, as a final refinement, the system may optionally apply conventional motion estimation analysis to a narrow window of frames before and after the candidate MOS to further refine the estimate. Using this method, the system produces a very high quality, consistent Moment of Snap identification that is robust against variations in video quality, camera panning and zooming, and human judgement.

In one aspect of the disclosure, a system for identifying a moment of snap may include one or more processor configured by machine-readable instructions. The system may be configured for training a neural network to detect one or more essential offensive formation element. The system may be configured for identifying, using the neural network, one or more essential offensive formation element within input video. The system may be configured for determining, using the identified one or more essential offensive formation element, one or more video frame including a valid formation, and for determining, using the detected one or more essential offensive formation element, one or more video frame in which the valid formation disbands.

In some aspects, one or more essential offensive formation element may include one or more Center, one or more lineman, and one or more backfield.

In some aspects, the system may be configured for assigning the one or more video frame in which the valid formation disbands as a moment of snap.

In some aspects, the system may be configured for identifying a final pre-snap formation and alignment.

In some aspects, the neural network may include a moment of snap estimation model.

In some aspects, the moment of snap estimation model may be updated every N video frame of input video to account for variations in panning, zooming, and lighting. In some aspects, N may be 1 or less.

In some aspects, the system may be configured for ignoring pre-snap motion from eligible receivers.

In some aspects, training a neural network may include annotating essential offensive formation elements on samples of video.

In another aspect of the disclosure, a method for identifying a moment of snap within video, may include obtaining sets of football video information. In some aspects, the individual ones of the sets of football video information may reflect gameplay. The method may include training a machine-learning model with the obtained sets of football video information such that the machine-learning model may recognize elements of an offensive formation within input video. In some aspects, the method may include storing the trained machine-learning model.

In some aspects, the elements may include one or more Center, one or more lineman, and one or more backfield.

In some aspects, the method may include determining, using the machine-learning model, a frame of the input video in which a valid formation is formed.

In some aspects, the method may include determining, using the machine-learning model, a frame of the input video in which the valid formation is disbanded.

In some aspects, the method may include assigning the frame of the input video in which the valid formation is disbanded as the moment of snap.

In some aspects, training the machine-learning model may include annotating the sets of football video information.

In some aspects, the machine-learning model may be updated every N video frame of the input video to account for variations in panning, zooming, and lighting. In some aspects, N may be 1 or less.

In some aspects, the machine-learning model may ignore motion from eligible receivers.

In another aspect of the disclosure, a method for identifying a moment of snap within video may include obtaining sets of football video information. In some aspects, the individual ones of the sets of football video information may reflect gameplay. In some aspects, the method may include training a machine-learning model with the obtained sets of football video information such that the machine-learning model classifies one or more frames of input video. In some aspects, the method may include storing the trained machine-learning model.

In some aspects, the machine-learning model may classify the one or more frames of input video as presnap or postsnap.

In some aspects, the method may include assigning the inflection point from presnap to postsnap as a moment of snap.

In another aspect of the disclosure, a method for identifying a moment of snap within video may include obtaining sets of football video information. In some aspects, the individual ones of the sets of football video information may reflect gameplay. In some aspects, the method may include training a machine-learning model with the obtained sets of football video information such that the machine-learning model identifies Offensive formations in one or more frames of input video. In some aspects, the method may include identifying all valid Offensive formations. In some aspects, the method may include storing the trained machine-learning model.

In some aspects, the machine-learning model may classify the one or more frames of input video as including a valid or invalid Offensive formation.

In some aspects, the method may include assigning the inflection point of frames having a valid Offensive formation to an invalid Offensive formation as a moment of snap.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly.

DETAILED DESCRIPTION

Figure 1:
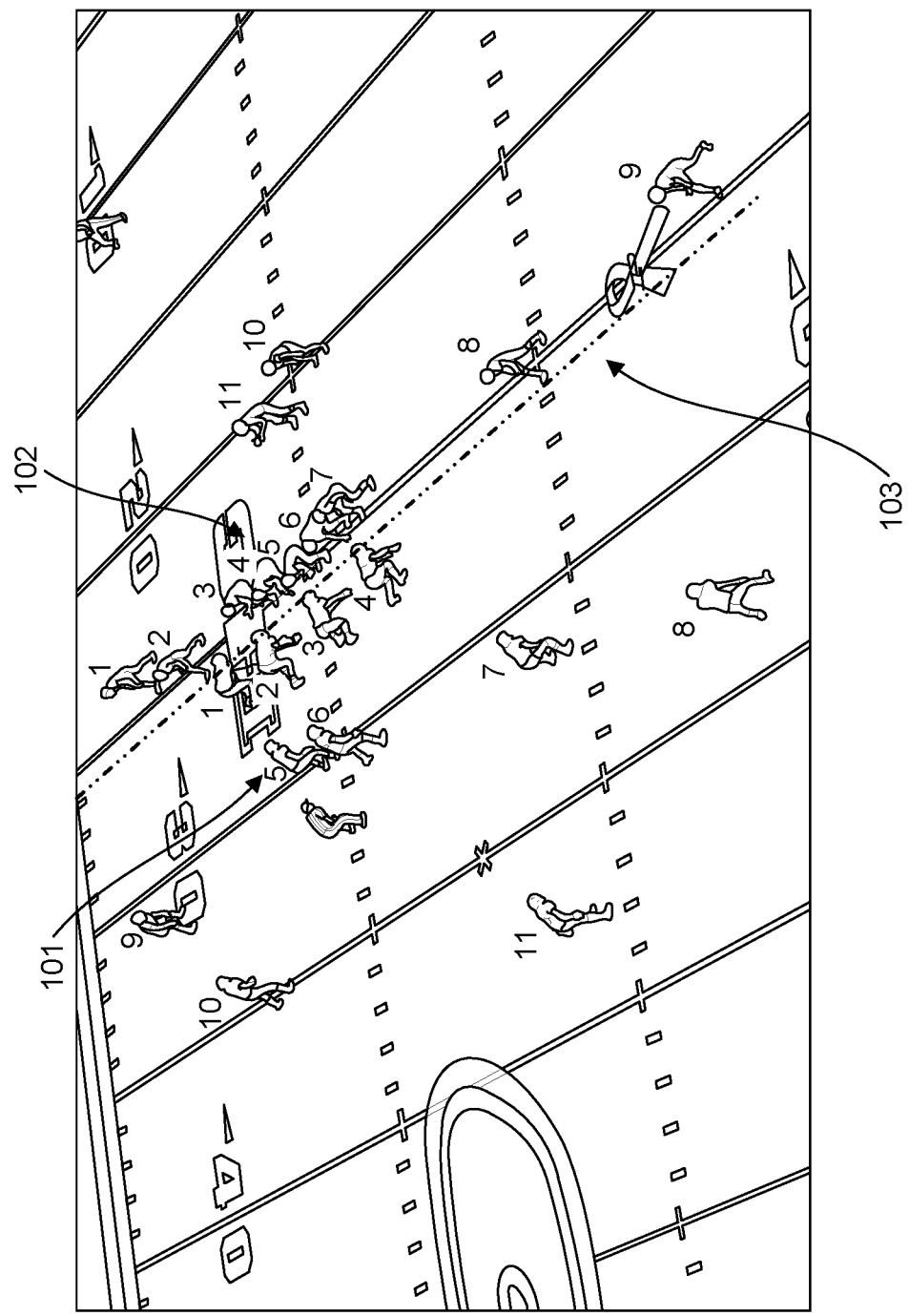
FIG. 1 depicts Offensive and Defensive players on the field of play before the Moment of Snap with the Offensive players aligned in a valid Offensive formation.

The method and the system of this invention center around the innovative concept of using deep learning object detection to recognize existing parts of an Offensive formation within video to identify the window of frames when the offense forms and then eventually disbands, thereby signifying the start of the play. Referring to FIG. 1, in American football each play is competition between an Offense 102 and Defense 101 separated before the play begins by an imaginary boundary called a Line of Scrimmage 103 at the location of the ball on the field of play. The Offense 102 and Defense 101 each have up to eleven players on the field at any given time as depicted by the numbering beside the players in FIG. 1. There are many rules for how game play advances, but, in short, the Offense 102 has the goal of moving the ball the length of the field of play into the "end zone" to score points while the Defense 101 tries to stop them from doing so.

At the beginning of each play, the Offense 102 aligns into an offensive formation according to a set of formation rules. The full set of rules is beyond the scope of this description, but the most applicable rules are: there can be up to eleven players on the field for a given play, there must be seven players on the line of scrimmage, a specific player called the Center "snaps" the ball to a backfield player to begin the play, and nearly all players must be stationary when the ball is snapped-hereinafter referred to as the Moment of Snap (MOS). Eligible receivers may move from one location to another location on their respective side of the line of scrimmage (commonly referred to as "motion") before the Moment of Snap but in most leagues a key constraint is that only one player may be moving just before the Center snaps the ball; otherwise, all other Offensive players must be stationary.

Figure 2:
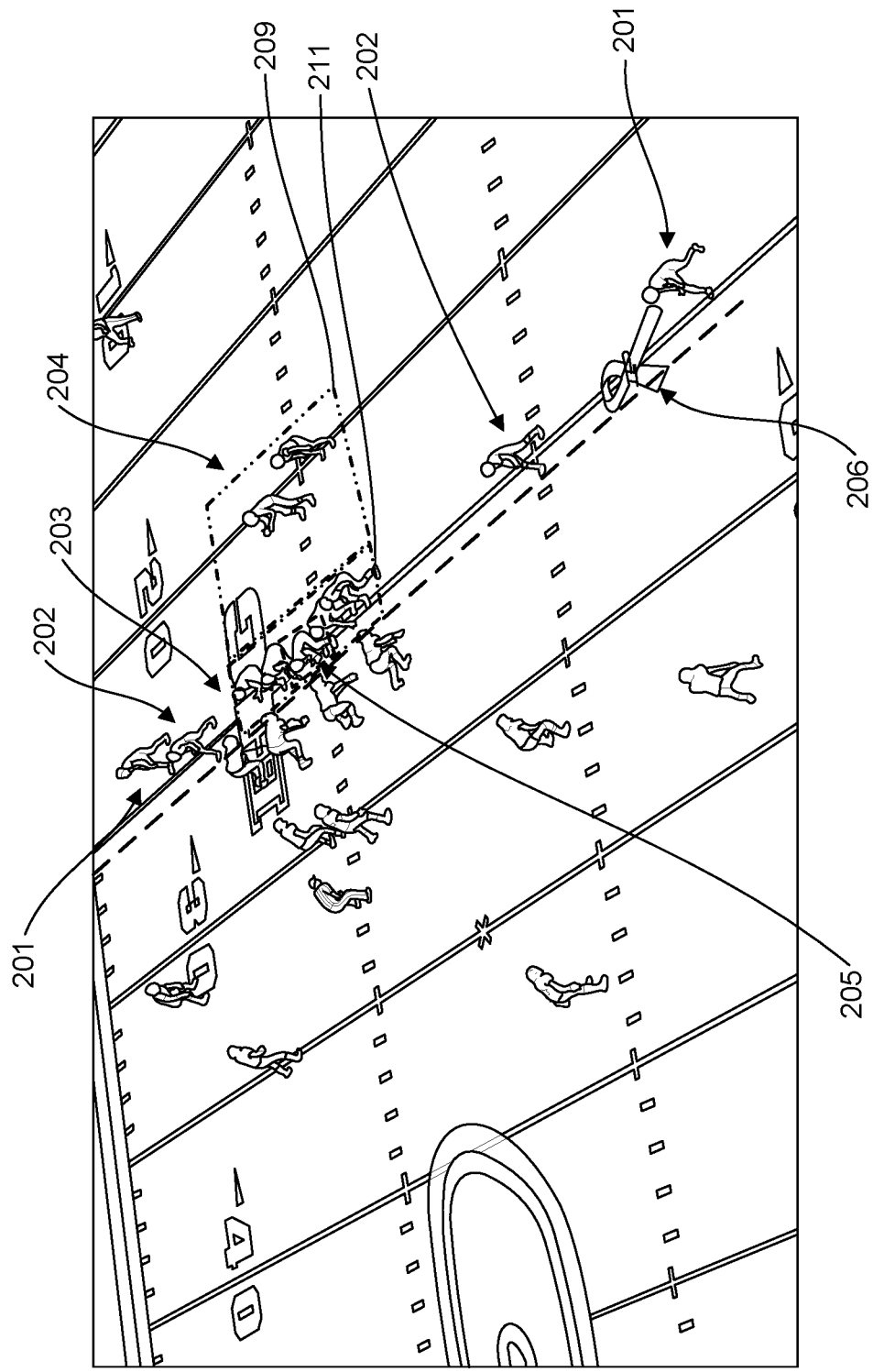
FIG. 2 depicts the key components that form together to construct a valid Offensive formation.

As depicted in FIG. 2, the Offensive formation can be decomposed into a distinct set of parts. First, the cornerstone of the formation is the Center player 205 who aligns at the location of the ball on the field and eventually snaps the ball to a backfield player 204 located in the backfield 209 to begin the play. The Center player 205 is a member of the Offensive Lineman 203 which is a collection of players aligned on the line of scrimmage 206. In FIG. 2, the Offensive Lineman 203 are positioned within box 211. There are typically at least five Offensive Lineman 203 in each formation, but this can be extended to include additional players such as Tightends or additional Offensive Lineman. Next, an Offensive formation has a Backfield which includes skilled players called "backs" (quarterback, halfback, fullback, etc.) located in the backfield 209 before the start of the play. These "backs" are responsible for taking the snap from the Center player 205 to start the play and then commonly handing or throwing the ball to other backs or eligible receivers. Lastly, an Offensive formation typically also has a finite number of receivers 201, 202 aligned to the left and right flanks of the Center player 205. There can be between zero and five receivers 201, 202 in an Offensive formation. Another important rule is that there must be seven players aligned "on" the line of scrimmage 206 which, given the typical five Offensive Lineman 203, means there are typically a mix of receivers aligned on the line of scrimmage 202 as well as receivers aligned off the line of scrimmage 201.

To identify the estimated Moment of Snap, a conventional approach would be to use object detection to identify each of the players in the video frame, then employ multiple object tracking (MOT) to track the movement of these players, and when the total movement of the players exceeds some predefined threshold then define this frame is as the Moment of Snap. Receiver motion as well as camera panning and zooming, however, will often generate false positives and a resulting inaccurate Moment of Snap. When a camera zooms or pans, the absolute locations of all the players within the video frame will change because these objects are located within a pixel-based coordinate system (sometimes called "pixel space"). The result: all players have different locations within consecutive video frames which the system will inaccurately recognize as movement for all players. This falsely recorded movement often exceeds the predefined threshold and results in reporting an inaccurate Moment of Snap.

Figure 3:
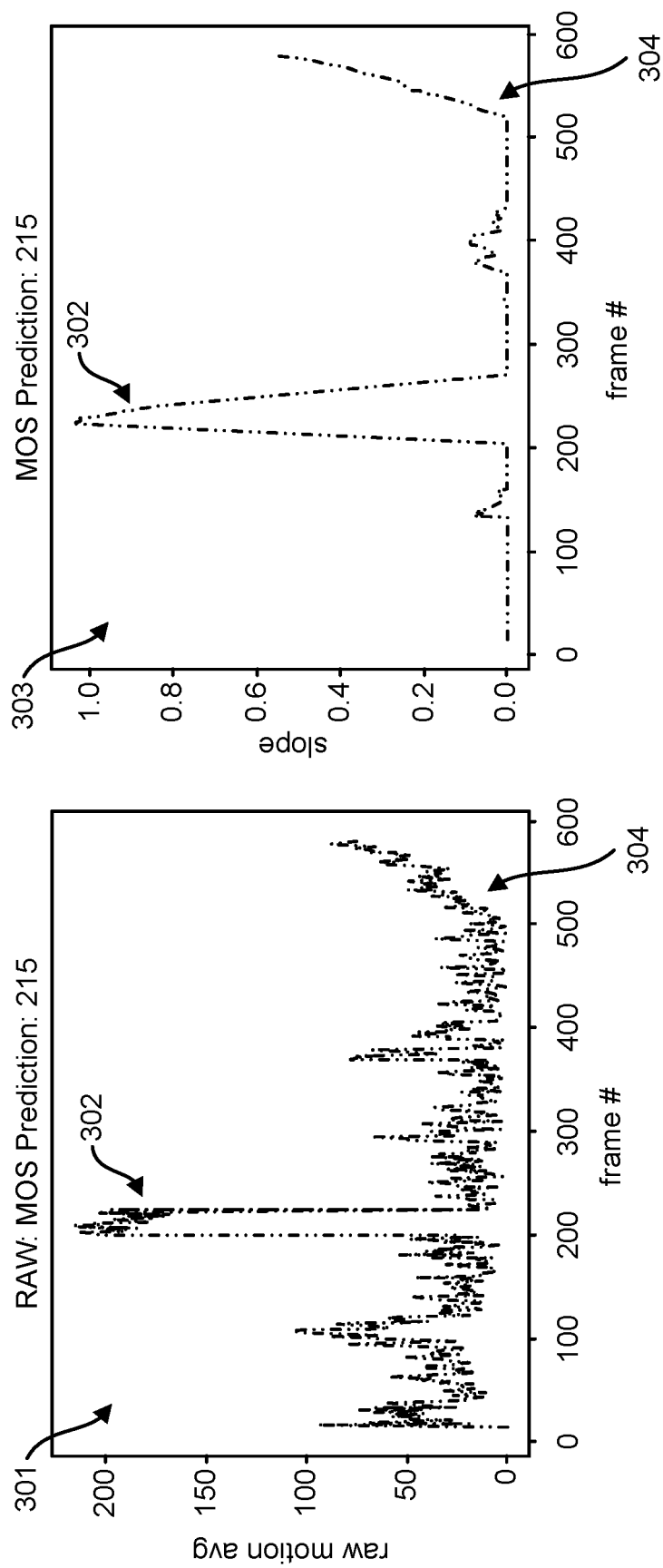
FIG. 3 depicts a plot of estimated player motion with a false reporting of the Moment of Snap due to the effects of camera panning and zooming before the play begins.

FIG. 3 shows a plot of player motion using this conventional approach. When the video begins, each of the Offensive players are identified and their positions tracked across consecutive frames in the video. The displacement of these players across the frames is then used to calculate the motion of the players. Unfortunately, the camera zooms and pans around frame two hundred for a period of approximately twenty frames which causes a large displacement of the recorded pixel locations of the players thereby generating a spike 302 in the total calculated motion. Unfortunately, this is a false reporting. The players have not started moving with the start of the play and this spike in motion 302 is instead caused by the camera movement. This results in an inaccurate reporting for the Moment of Snap at frame two hundred when in fact the true Moment of Snap is at frame five hundred thirty-five 304 as verified by a human expert. This spike 302 due to incorrectly reported player motion causes a false reporting for the Moment of Snap.

Figure 4:
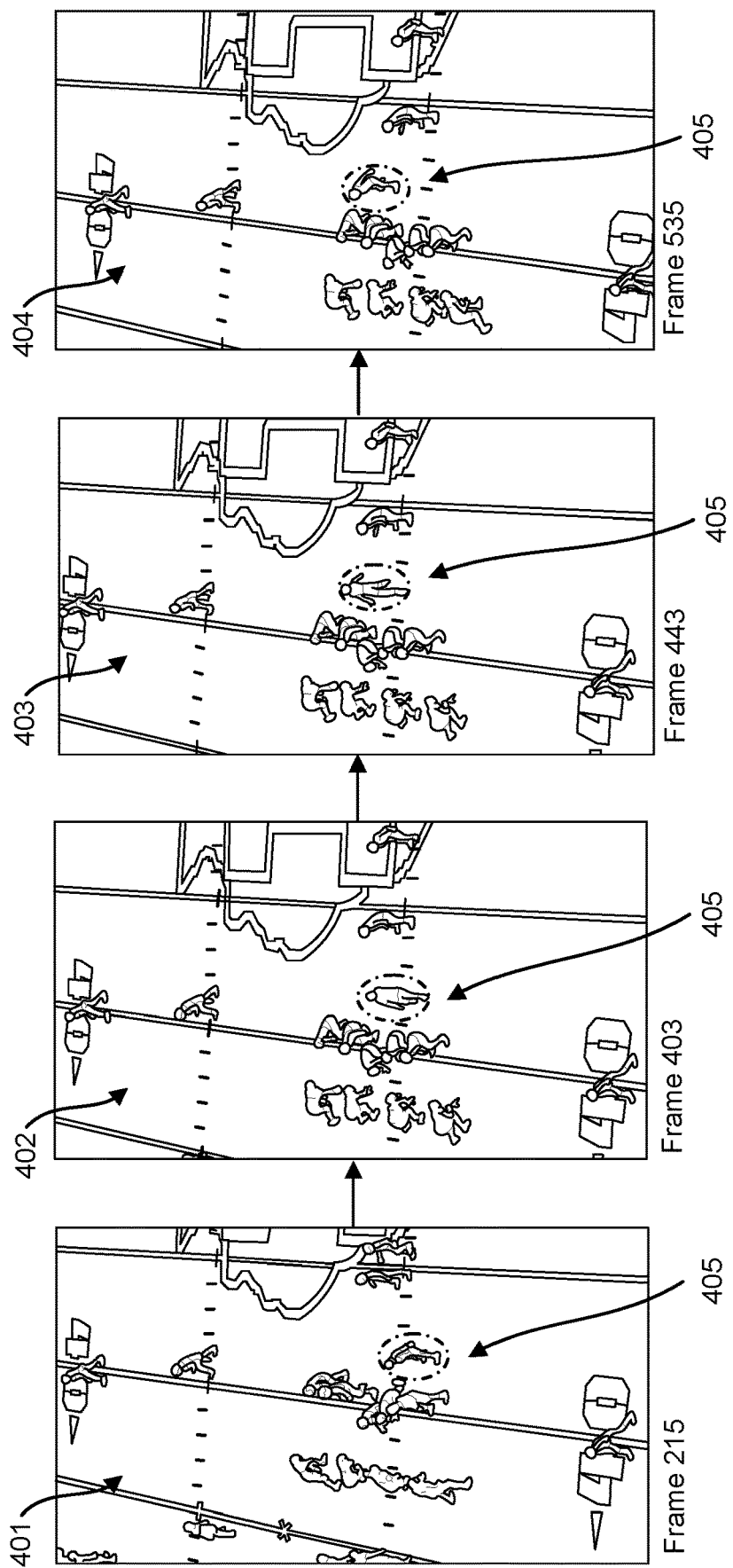
FIG. 4 depicts a progression of frames from a single play demonstrating an eligible receiver engaging in motion before the Moment of Snap.

To illustrate why a false reporting for the Moment of Snap is undesirable, consider FIG. 4 which depicts the sequence of frames for the same play which shows how an eligible receiver motions from one side of the formation to the other before the play begins. As depicted, the receiver 405 starts on the left side in 401, starts moving towards the Center of the formation in 402, continues moving to the right side of the Center player in 403, and finally settles into a new presnap location in 404. The final Offensive formation is set at this point (frame five hundred thirty-five of the input video), and the Center player snaps the ball to begin the play. Frame five hundred thirty-five is the Moment of Snap and football coaches would annotate this formation with the motioning receiver 405 on the right side of the formation as shown in 404 as opposed to when the player is located at his beginning location shown in 401. As a result, a falsely reported Moment of Snap in 302 will incorrectly snapshot the formation as shown in 401 which would result in a different, and incorrect, annotation for the presnap formation. This inaccurate annotation negatively affects the quality of produced datasets used by coaches to formulate their strategies and game plans.

Figure 5:
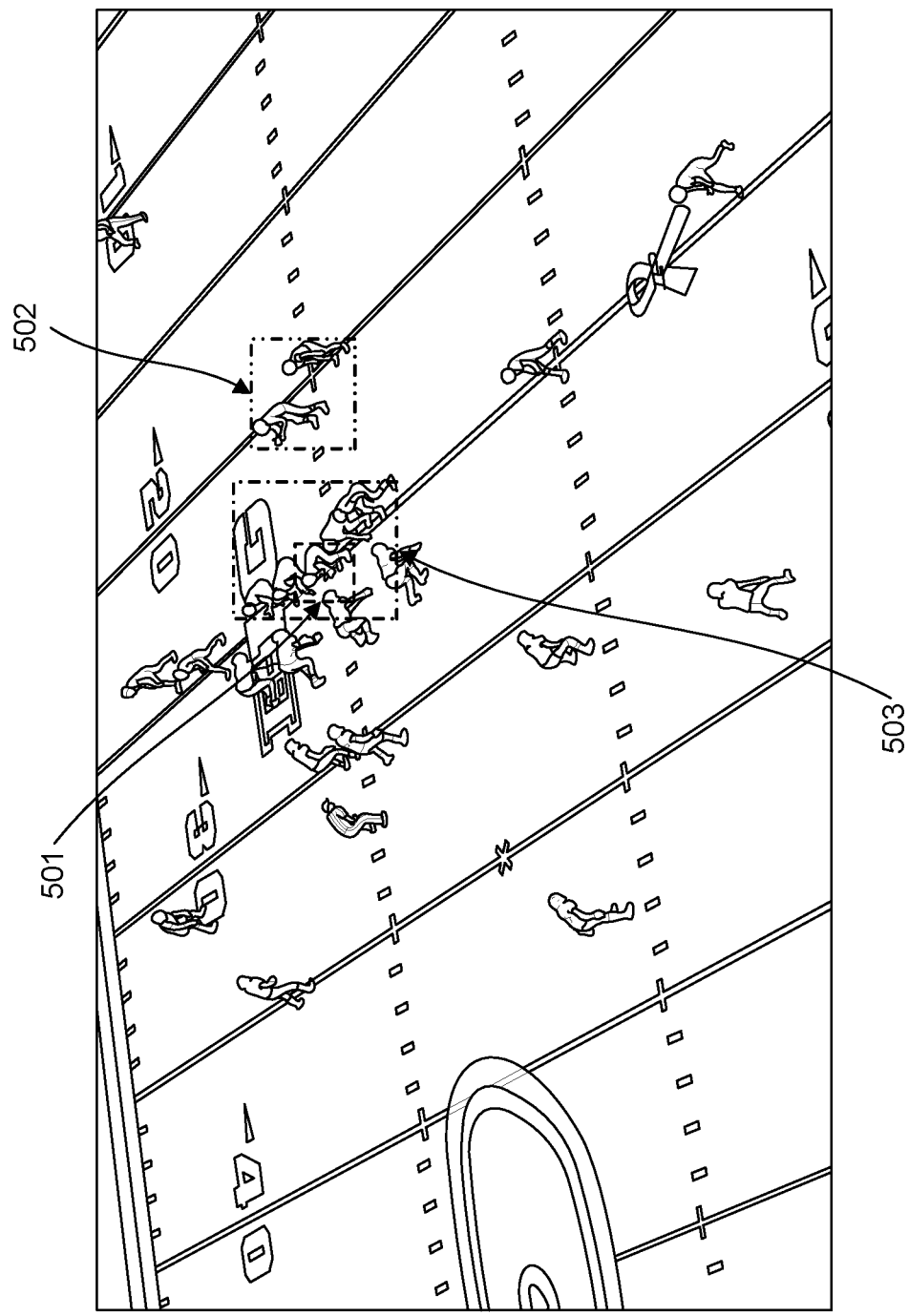
FIG. 5 is an illustration of the method and system of this invention showing how the parts of the Offensive formation are annotated for deep learning to train a neural network for object detection.

To avoid such false reports of the Moment of Snap, the present invention advances the art by instead using deep learning to train a model that can detect the key components of the Offensive formation—hereinafter called the essential Offensive formation elements—to identify the window of frames when the offense forms and disbands from being a valid formation, thereby signifying the start of the play. To do so, the system must first be able to detect these objects in real-time within the input video. To enable this capability, the system employs deep learning to train a neural network model which can detect the players aligned as the Center, Offensive Lineman, and Backfield players on the field of play. As depicted in FIG. 5, thousands of images of football fields from different camera angles, lighting conditions, perspectives, etc. were obtained and the Center 501, Offensive Lineman 503, and Backfield 502 elements within the images were annotated by human experts. These annotations were then used to train a neural network and produce a generalized model which is then able to identify these same types of formation objects 501, 502, 503 in otherwise unseen video footage processed by the system. With this generalized neural network model, the system performs inference on the frames within the input video to construct a "MOS model".

This MOS model is kept in memory and reconstructed every N frames (often N=1 or less) to account for the camera panning and zooming as the football play ensues. This is an important consideration because the video quality varies based upon the camera equipment used, camera operator, lighting conditions, etc. so it is not sufficient to only construct the MOS model once—it must be repeatedly reconstructed. Importantly, because the neural network model was trained using thousands of images from different zoom levels and perspectives, camera panning and zooming does not materially affect the neural network model's object detection performance.

Figure 6:
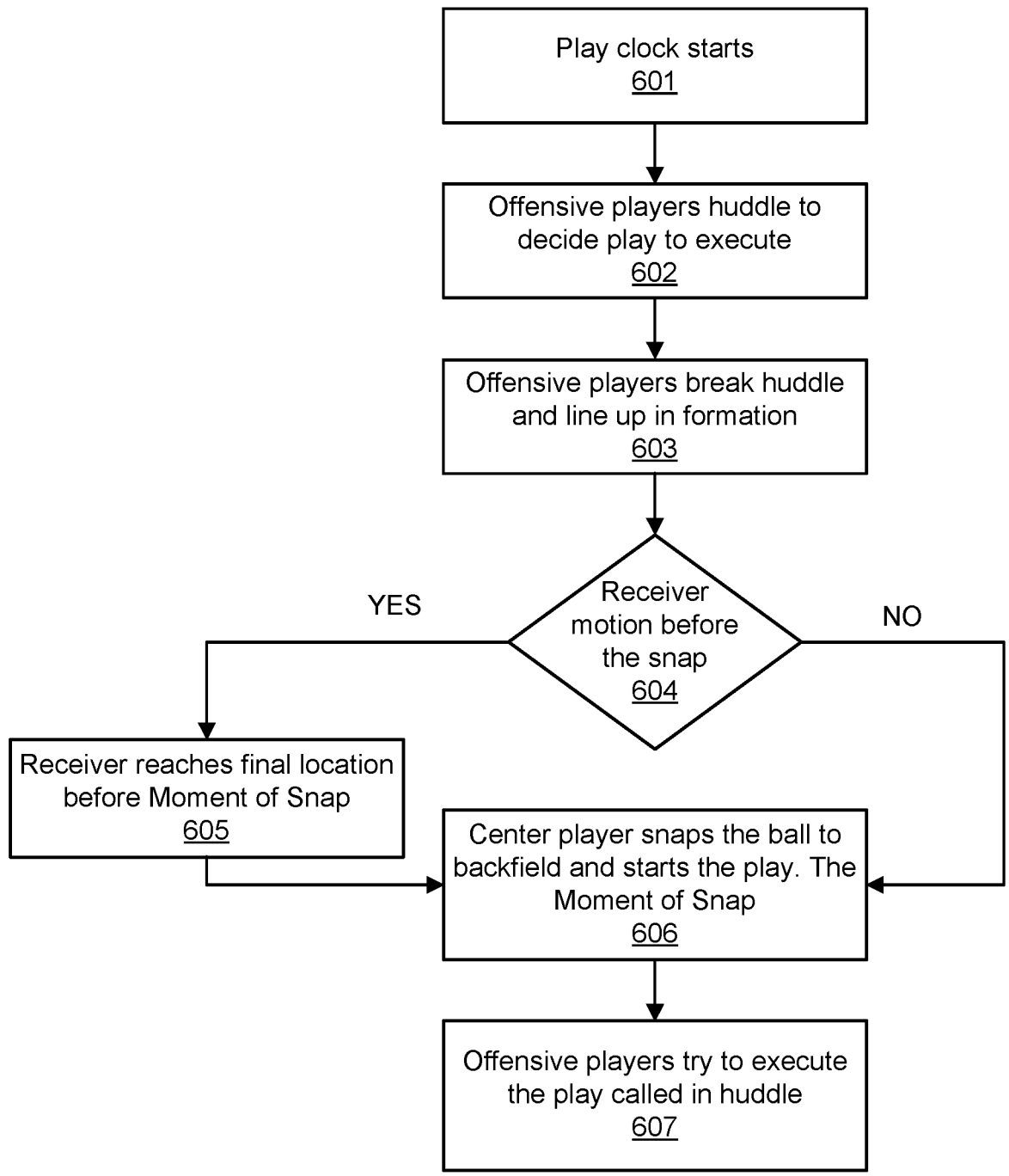
FIG. 6 depicts the sequence of steps in the lifecycle of an Offensive play.

FIG. 6 depicts the sequence of steps in the lifecycle of an Offensive play. To construct the MOS model, the system starts executing inference at the beginning of the input video 601 and recording which of the essential Offensive formation elements 501, 502, 503 are identified within each frame. The system uses basic reference counting for each object type of Offensive formation elements 501, 502, 503 within the frames. Typically, none of the essential elements are identified in stages 601, 602 and only when the players start to line up in their respective areas of the Offensive formation at stage 603 does the system start to positively identify objects 501, 502, 503. Ordinarily, the Center player 501 is the first object identified in stage 603 because he is one of the first players to line up in formation since he is responsible for snapping the ball to the Backfield 502 to start the play.

Commonly, an eligible receiver such as 405 will engage in presnap motion during stage 604. Motion is defined as when a player moves or shifts from one location on the field to another before the Moment of Snap. In the example of FIG. 4, the eligible receiver 405 shifts from the left side of the formation in stage 604 to the right side of the formation and completes the motion by stage 605. At stage 606, the Center player 501 snaps the ball to a player in the Backfield 502 to start the play and in stage 607 all the Offensive players 102 start moving on the field to execute the play that was called in the huddle at stage 602.

The system uses the neural network model to continually execute inference in each of the frames throughout the stages 601, 602, 603, 604, 605, and 606 of the input videos. For each frame, the system updates the reference counts of the essential Offensive formation elements 501, 502, 503 in its in-memory MOS model. When all the essential Offensive elements 501, 502, 503 are identified in a frame the system assumes the Offense 102 has formed a valid formation. Then, some unknown and undefined number of frames later, the system's inference execution will NOT detect all the essential Offensive formation elements 501, 502, 503 in a frame because the Offensive players have disbanded the formation in stage 606 and the players are now moving on the field to execute the play in stage 607. This frame number when the Offensive formation elements 501, 502, 503 are no longer detected in the video is defined as the Moment of Snap.

Figure 7:
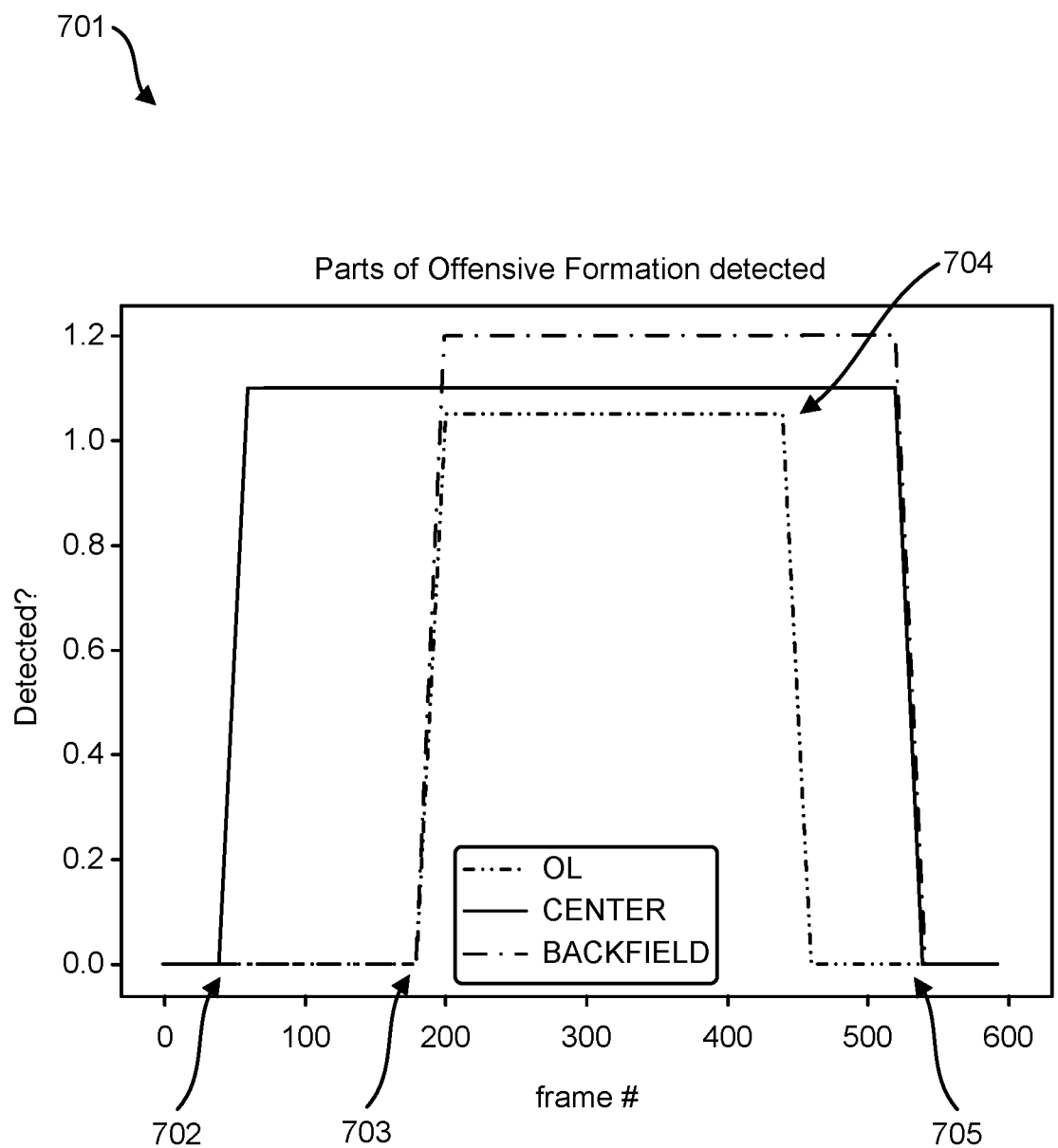
FIG. 7 is an illustration of the method and system of this invention showing a timing diagram for the identified parts of an Offensive formation, namely the Center, the Offensive Lineman, and the Backfield. The timing diagram shows the window of frames for when each object is detected.

FIG. 7 is an illustration of the method and system of this invention showing a timing diagram for the identified parts of an Offensive formation, namely the Center 501, the Offensive Lineman 503, and the Backfield 502. The timing diagram 701 shows the window of frames for when each type of object is identified within the input video. 702 indicates the first frame when the Center player 501 is detected by the neural network model in stage 603 of the play. Notice how this detection of the Center player 501 is earlier than the first frame 703 when the neural network detects the presence of Offensive Lineman 503 and Backfield 502 objects within the video. The system continues executing inference through stages 604 and 605 and ignores any presnap motion from eligible receivers such as 405 because it still detects objects 501, 502, and 503 within the video. At 704 in the timing diagram, however, the system starts failing to detect the Offensive Lineman 503 and then at 705 the system no longer detects the Center player 501 or Backfield 502 objects. The system recognizes that no essential Offensive formation elements 501, 502, 503 are being positive identified by the neural network model at 705 and as a result declares this frame number as the Moment of Snap.

Figure 8:
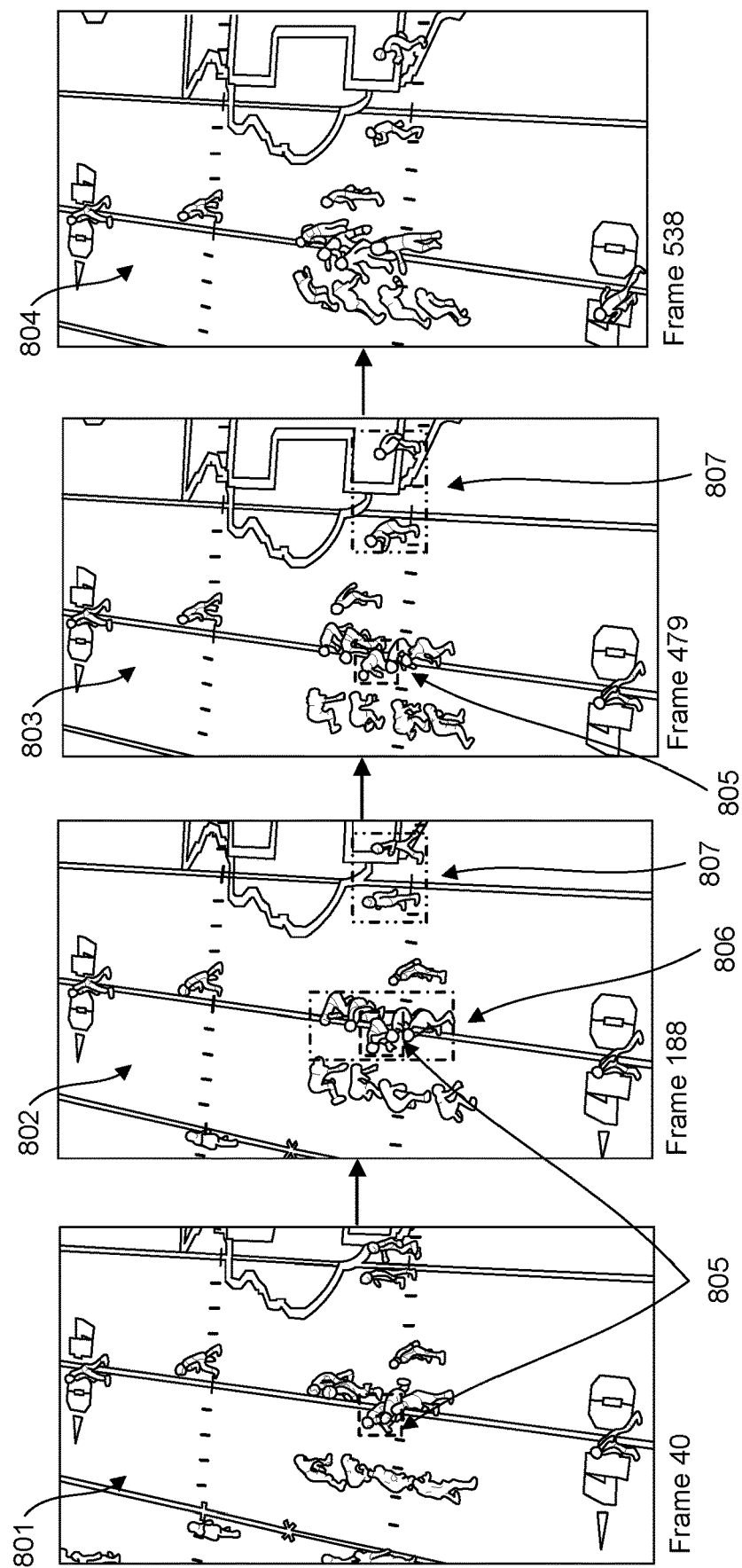
FIG. 8 is an illustration of the method and system of this invention showing how the neural network detects the parts of an Offensive formation across a sample set of frames from the input video.

Finally, FIG. 8 depicts this same series of events with the method and system of this invention showing how the neural network detects the parts of an Offensive formation across a sample set of frames from the same play. Starting in 801, the system first detects the Center player 805 in stage 603 of the play. Next, in 802 the system detects all the essential Offensive formation elements 805, 806, 807 in stages 603 and 604. Then, in 803 the system does not detect the Offensive Lineman 806 any longer which corresponds to 704 in the timing diagram. This frame number corresponds to the window of time between stages 605 and 606 where the eligible receiver 405 that engaged in presnap motion is now at his final location 605 before the Moment of Snap. Lastly, in 804 the system no longer recognizes any of the essential Offensive elements 805, 806, 807 which corresponds to 705 in the timing diagram and stage 606 in the lifecycle of the play. At this point, the system declares frame five hundred and thirty-five (which was the last frame an essential Offensive element 502, 503 was detected) as the Moment of Snap.

Using this method, the system constructs and maintains a MOS model as the lifecycle of the play develops through stages 601, 602, 603, 604, 605 to accurately detect the Moment of Snap in stage 606 when none of the essential Offensive formation elements 501, 502, 503 are detected. This method results in the system producing a high confidence estimate for the Moment of Snap. Further, this method has been tested on tens of thousands of input videos and the resulting Moment of Snap identifications have proven to be very, very accurate. Moreover, this system has produced a model that independent of human error, subjectivity, and it accounts for the wide variations in the video quality. The system can use this MOS model to now automatically "snapshot" the final presnap Offensive formations and alignments for coaches to review, assist with other video analytic processes, or be used an aid to human experts otherwise manually annotating video.

Figure 9:
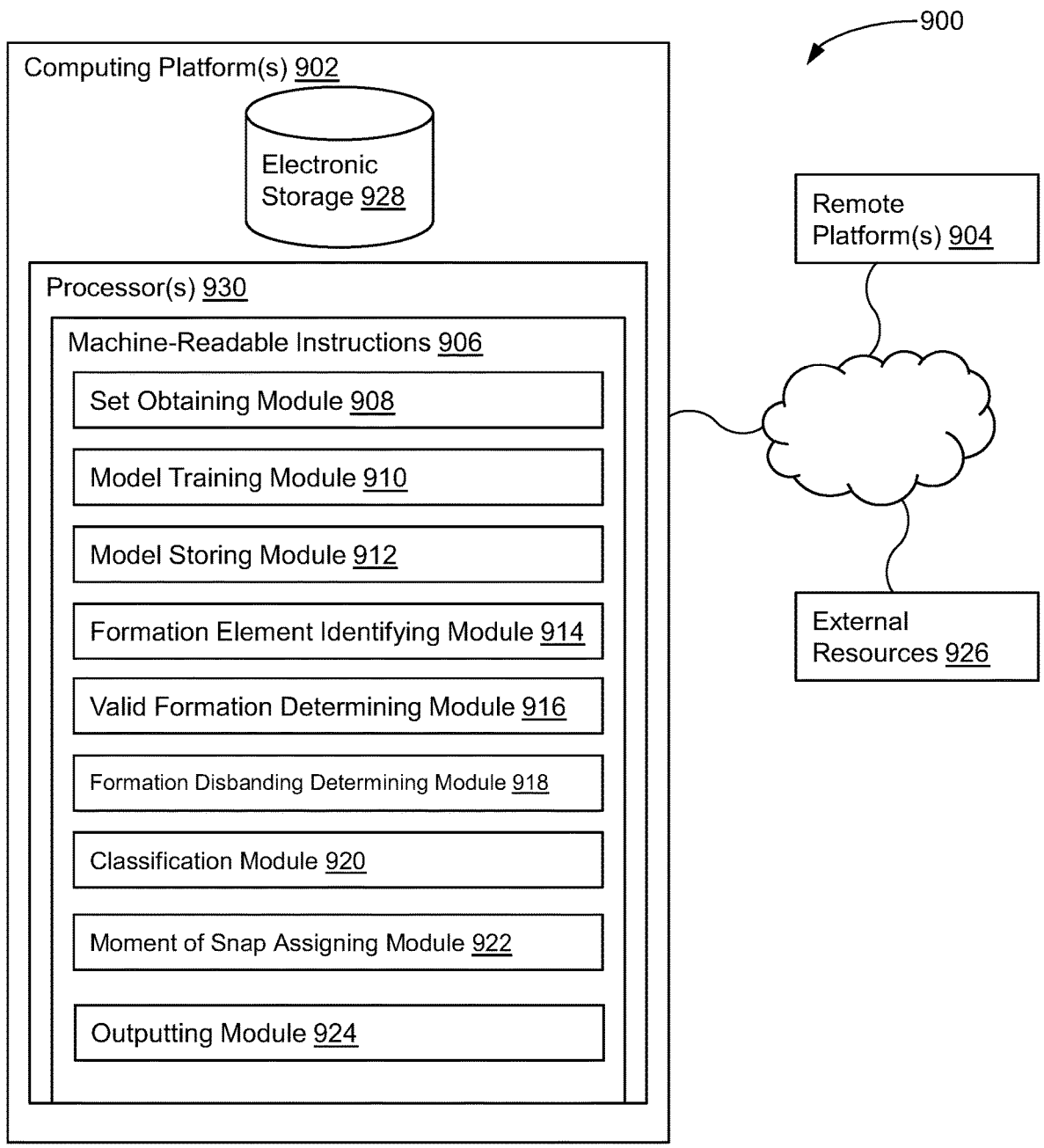
FIG. 9 illustrates a system configured for identifying a moment of snap within video, in accordance with one or more implementations.

FIG. 9 illustrates a system 900 configured for identifying a moment of snap within video, in accordance with one or more implementations. In some implementations, system 900 may include one or more computing platforms 902. Computing platform(s) 902 may be configured to communicate with one or more remote platforms 904 according to a client/server architecture, a peer-to-peer architecture, and/or other architectures. Remote platform(s) 904 may be configured to communicate with other remote platforms via computing platform(s) 902 and/or according to a client/server architecture, a peer-to-peer architecture, and/or other architectures. Users may access system 900 via remote platform(s) 904.

Computing platform(s) 902 may be configured by machine-readable instructions 906. Machine-readable instructions 906 may include one or more instruction modules. The instruction modules may include computer program modules. The instruction modules may include one or more of set obtaining module 908, model training module 910, model storing module 912, formation element identifying module 914, valid formation determining module 916, formation disbanding determining module 918, classification module 920, moment of snap assigning module 922, outputting module 924, and/or other instruction modules.

Set obtaining module 908 may be configured to obtain sets of football video information. Individual ones of the sets of football video information may reflect gameplay. The football video information may include one or more frames of a football game or practice including still images, moving images, video, and may include digital or analog video. In some aspects, the football video information may be transformed in some manner prior to being obtained. Gameplay may include at least a portion of a football game or practice and may include images of players, field markings, lines, plays, objects, gear, and other items necessary for playing football. The video may include one or more frames from various angles, positions, locations, lighting, video speeds, games, or teams.

Model training module 910 may be configured to train a machine-learning model, also known as a neural network or artificial intelligence model, with the obtained sets of football video information. In one aspect, the machine-learning model may be configured to recognize elements, or essential elements, of an offensive formation within input video. Input video may refer to any previously unviewed, unseen, or unannotated video footage. The elements, or essential elements, of an offensive formation may include various players on the field, for example one or more Center, backfield players, or offensive linemen as discussed above. During training of the machine-learning model, sample video from a plurality of different games, practices, and situations may be annotated by a human to identify the various elements, or essential elements, of offensive formations.

In another aspect, the machine-learning model may be trained such that the machine-learning model classifies one or more frame of input video. In this situation, the machine-leaning model may classify one or more frame as presnap, meaning the moment before the ball has been put into play, and postsnap, meaning after the moment the ball has been put into play. During training of the machine-learning model, sample video from a plurality of different games, practices, and situations may be annotated or classified by a human to identify the frames as one of presnap or postsnap.

In another aspect, the machine-learning model may be trained such that the machine-learning model can identify a valid formation including all 11 offensive players and classifies one or more frame of input video. In this situation, the machine-leaning model may classify one or more frame as having a valid offensive formation, and one or more frame as having an invalid offensive formation. During training of the machine-learning model, sample video from a plurality of different games, practices, and situations may be annotated or classified by a human to identify all possible valid offensive formations.

Model storing module 912 may be configured to store the trained machine-learning model. The model may be stored in any location and in any type of storage media. The model may be encrypted prior to storage, during storage, and/or upon retrieval from storage. In some aspects, the model may be stored remotely, in other aspects, the model may be stored locally.

Formation element identifying module 914 may be configured to identify, using the machine-learning model, one or more element or essential offensive formation element in one or more frame of input video. The input video may be any unseen or unannotated video reflecting at least one frame of football gameplay. The one or more element or essential offensive formation element may include one or more Center, one or more lineman, and one or more backfield.

Valid formation determining module 916 may be configured to determine, using one or more identified element or essential offensive formation element, one or more frame of video including a valid offensive formation. In some aspects, a valid offensive formation is identified when all the essential offensive elements are identified in one or more frame of input video. In some aspects, a valid offensive formation may include all 11 offensive players.

Formation disbanding determining module 918 may be configured determine, using one or more identified element or essential offensive formation element, one or more video frame in which the valid offensive formation disbands. The valid offensive formation is determined to be disbanded when all the essential offensive formation elements are NOT detected in one or more frame. This implies that the Offensive players (i.e., essential offensive formation elements) have disbanded the formation and are now moving on the field to execute the play following the moment of snap.

Classification module 920 may be configured to classify, using a machine-learning model, each frame of input video. In some aspects, classification module 920 may identify frames before a moment of snap as presnap and frames following a moment of snap as postsnap. In some aspects, all frames of input video may receive a classification. In other aspects, only a subset of the frames in input video may receive a classification. For example, only frames within several seconds on either side of the beginning of play (i.e., moment of snap) may receive a classification. In such an example, classification may be applied to 120 frames prior to the moment of snap (assuming a speed of 60 frames per second) as well as 120 frames after the moment of snap. In some aspects, classification module 920 may identify one or more frame as having a valid offensive formation and one or more frame as having an invalid offensive formation.

Moment of snap assigning module 922 may be configured assign one or more frame of input video as the moment of snap. Assigning may include tagging, labeling, annotating, storing in memory, or otherwise indicating one or more specific frames. In some aspects, the moment of snap may be assigned to a single frame of video. In other aspects, the moment of snap may be assigned over two or more frames. In one aspect, the moment of snap assigning module 922 may assign the one or more video frame in which a valid formation disbands as a moment of snap. In this arrangement, the one or more frame when essential elements of an offensive formation are no longer detected is assigned as the moment of snap. In another aspect, the moment of snap assigning module 922 may assign the inflection point between frames classified as presnap and frames classified as postsnap as the moment of snap. The inflection point may include a single frame of video or a plurality of frames of video. The inflection point refers to the time or frame at which there is a change between a presnap classification and a postsnap classification of video frames. In some aspects, the moment of snap assigning module 922 may assign an inflection point between frames classified as having a valid offensive formation and frames classified as having an invalid offensive formation as the moment of snap Outputting module 924 may be configured to output information to one or more display or storage devices. The output information may include information derived from the various modules of or information input into system 900. For example, the output information may include an annotation indicating the moment of snap on one or more frame of input video.

In some implementations, computing platform(s) 902, remote platform(s) 904, and/or external resources 926 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 902, remote platform(s) 904, and/or external resources 926 may be operatively linked via some other communication media.

A given remote platform 904 may include one or more processors configured to execute computer program modules. The computer program modules may be configured to enable an expert or user associated with the given remote platform 904 to interface with system 900 and/or external resources 926, and/or provide other functionality attributed herein to remote platform(s) 904. By way of non-limiting example, a given remote platform 904 and/or a given computing platform 902 may include one or more of a server, a desktop computer, a laptop computer, a handheld computer, a tablet computing platform, a Netbook, a Smartphone, a gaming console, supercomputer, quantum computer, and/or other computing platforms.

External resources 926 may include sources of information outside of system 900, external entities participating with system 900, and/or other resources. In some implementations, some or all of the functionality attributed herein to external resources 926 may be provided by resources included in system 900.

Computing platform(s) 902 may include electronic storage 928, one or more processors 930, and/or other components. Computing platform(s) 902 may include communication lines, or ports to enable the exchange of information with a network and/or other computing platforms. Illustration of computing platform(s) 902 in FIG. 9 is not intended to be limiting. Computing platform(s) 902 may include a plurality of hardware, software, and/or firmware components operating together to provide the functionality attributed herein to computing platform(s) 902. For example, computing platform(s) 902 may be implemented by a cloud of computing platforms operating together as computing platform(s) 902.

Electronic storage 928 may comprise non-transitory storage media that electronically stores information. The electronic storage media of electronic storage 928 may include one or both of system storage that is provided integrally (i.e., substantially non-removable) with computing platform(s) 902 and/or removable storage that is removably connectable to computing platform(s) 902 via, for example, a port (e.g., a USB port, a firewire port, etc.) or a drive (e.g., a disk drive, etc.). Electronic storage 928 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 928 may include one or more virtual storage resources (e.g., cloud storage, a virtual private network, and/or other virtual storage resources). Electronic storage 928 may store software algorithms, information determined by processor(s) 930, information received from computing platform(s) 902, information received from remote platform(s) 904, and/or other information that enables computing platform(s) 902 to function as described herein.

Processor(s) 930 may be configured to provide information processing capabilities in computing platform(s) 902. As such, processor(s) 930 may include one or more of a digital processor, an analog processor, a digital circuit designed to process information, an analog circuit designed to process information, a state machine, and/or other mechanisms for electronically processing information. Although processor(s) 930 is shown in FIG. 9 as a single entity, this is for illustrative purposes only. In some implementations, processor(s) 930 may include a plurality of processing units. These processing units may be physically located within the same device, or processor(s) 930 may represent processing functionality of a plurality of devices operating in coordination. Processor(s) 930 may be configured to execute modules 908, 910, 912, 914, 916, 918, 920, 922, and/or 924, and/or other modules. Processor(s) 930 may be configured to execute modules 908, 910, 912, 914, 916, 918, 920, 922, and/or 924, and/or other modules by software; hardware; firmware; some combination of software, hardware, and/or firmware; and/or other mechanisms for configuring processing capabilities on processor(s) 930. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 908, 910, 912, 914, 916, 918, 920, 922, and/or 924 are illustrated in FIG. 9 as being implemented within a single processing unit, in implementations in which processor(s) 930 includes multiple processing units, one or more of modules 908, 910, 912, 914, 916, 918, 920, 922, and/or 924 may be implemented remotely from the other modules. The description of the functionality provided by the different modules 908, 910, 912, 914, 916, 918, 920, 922, and/or 924 described below is for illustrative purposes, and is not intended to be limiting, as any of modules 908, 910, 912, 914, 916, 918, 920, 922, and/or 924 may provide more or less functionality than is described. For example, one or more of modules 908, 910, 912, 914, 916, 918, 920, 922, and/or 924 may be eliminated, and some or all of its functionality may be provided by other ones of modules 908, 910, 912, 914, 916, 918, 920, 922, and/or 924. As another example, processor(s) 930 may be configured to execute one or more additional modules that may perform some or all of the functionality attributed below to one of modules 908, 910, 912, 914, 916, 918, 920, 922, and/or 924.

FIGS. 10A, 10B, 10C, and 10D illustrate a method 1000 for identifying a moment of snap within video, in accordance with one or more implementations. The operations of method 1000 presented below are intended to be illustrative. In some implementations, method 1000 may be accomplished with one or more additional operations not described, and/or without one or more of the operations discussed. Additionally, the order in which the operations of method 1000 are illustrated in FIGS. 10A, 10B, 10C, and 10D, and described below is not intended to be limiting.

In some implementations, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

Figure 10A:
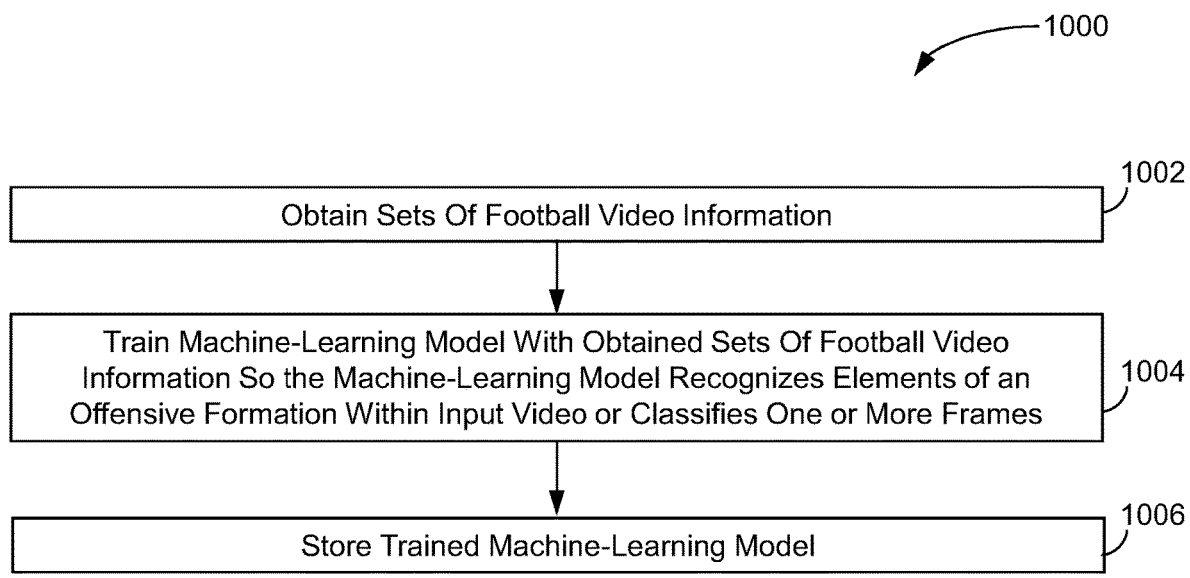
FIGS. 10A, 10B, 10C, and 10D illustrate a method for identifying a movement of snap within video, in accordance with one or more implementations.

FIG. 10A illustrates method 1000, in accordance with one or more implementations.

An operation 1002 may include obtaining sets of football video information. The sets of football video information may reflect gameplay. Operation 1002 may be performed by one or more hardware processors configured by machine-readable instructions including a module that is the same as or similar to set obtaining module 908, in accordance with one or more implementations.

An operation 1004 may include training a machine-learning model with the obtained sets of football video information such that the machine-learning model recognizes one or more elements or essential elements of an offensive formation within input video or classifies one or more frame of input video. Operation 1004 may be performed by one or more hardware processors configured by machine-readable instructions including a module that is the same as or similar to model training module 910, in accordance with one or more implementations.

An operation 1006 may include storing the trained machine-learning model. Operation 1006 may be performed by one or more hardware processors configured by machine-readable instructions including a module that is the same as or similar to model storing module 912, in accordance with one or more implementations.

Figure 10B:
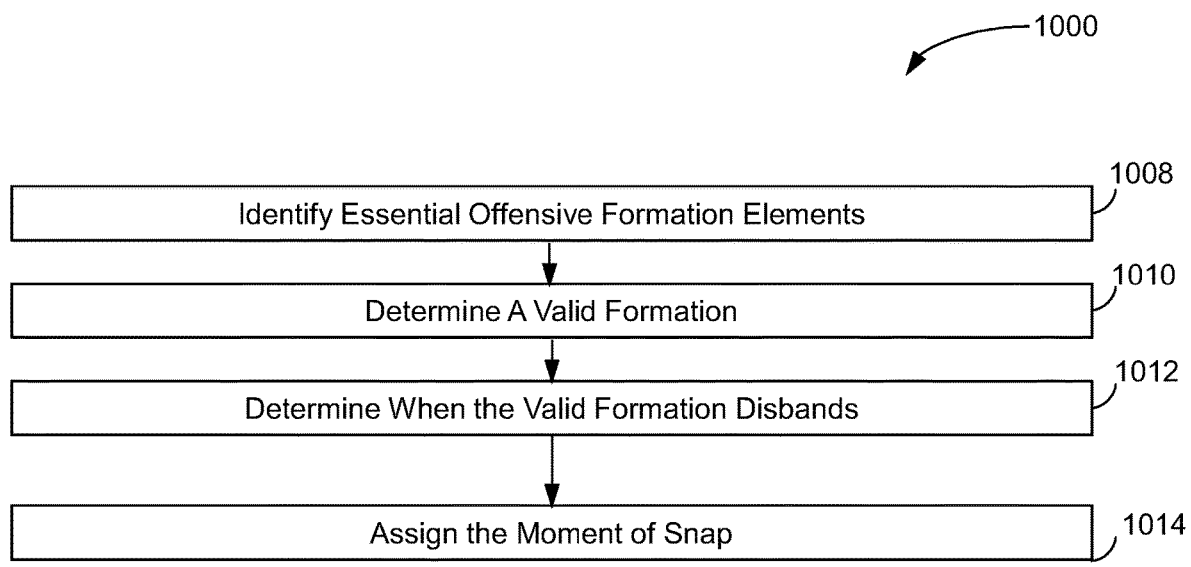

FIG. 10B illustrates method 1000, in accordance with one or more implementations. An operation 1008 may include identifying, using a neural network or machine-learning model, one or more essential offensive formation element within input video. Input video may include video that has been unviewed by the system and/or includes no annotations. Operation 1008 may be performed by one or more hardware processors configured by machine-readable instructions including a module that is the same as or similar to formation element identifying module 914, in accordance with one or more implementations.

An operation 1010 may include determining, using one or more identified essential offensive formation element, one or more video frame including a valid formation. In some aspects, the one or more field object may include one or more hashmark or field number. Operation 1010 may be performed by one or more hardware processors configured by machine-readable instructions including a module that is the same as or similar to valid formation determining module 916, in accordance with one or more implementations.

An operation 1012 may include determining, using one or more identified essential offensive formation element, one or more video frame in which a valid formation disbands. Operation 1012 may be performed by one or more hardware processors configured by machine-readable instructions including a module that is the same as or similar to formation disbanding determining module 918, in accordance with one or more implementations.

An operation 1014 may include assigning the one or more video frame in which the valid formation disbands as the moment of snap. Operation 1014 may be performed by one or more hardware processors configured by machine-readable instructions including a module that is the same as or similar to the moment of snap assigning module 924, in accordance with one or more implementations.

Figure 10C:
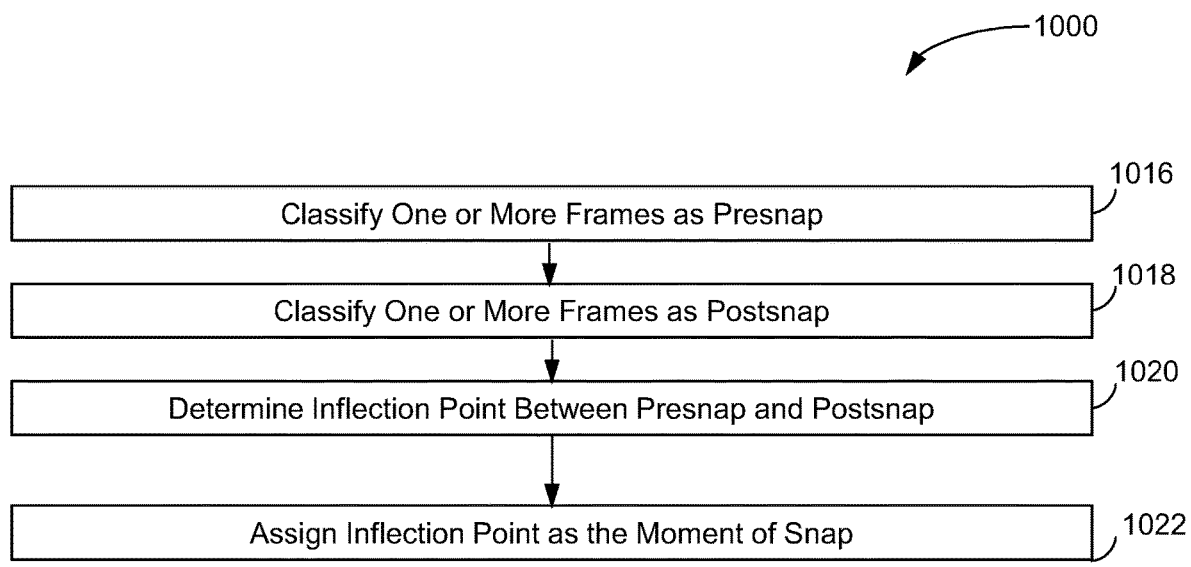

FIG. 10C illustrates method 1000, in accordance with one or more implementations. An operation 1016 may include classifying, using a neural network or machine-learning model, one or more frames of input video occurring before play begins as presnap. For example, frames indicating that a team forms a huddle, breaks a huddle, and lines up on the line of scrimmage may be classified as presnap. Input video may include video that has been unviewed by the system and includes no annotations. Operation 1016 may be performed by one or more hardware processors configured by machine-readable instructions including a module that is the same as or similar to classification module 920, in accordance with one or more implementations.

An operation 1018 may include classifying, using a neural network or machine-learning model, one or more frames of input video occurring after the play begins as postsnap. For example, frames indicating that a team is running a play may be classified as postsnap. Operation 1018 may be performed by one or more hardware processors configured by machine-readable instructions including a module that is the same as or similar to classification module 920, in accordance with one or more implementations.

An operation 1020 may include determining an inflection point, or change between, frames labeled or classified as presnap and frames labeled or classified as postsnap. Operation 1020 may be performed by one or more hardware processors configured by machine-readable instructions including a module that is the same as or similar to classification module 920 or moment of snap assigning module 924, in accordance with one or more implementations.

An operation 1022 may include assigning the inflection point, or change between, frames labeled or classified as presnap and frames labeled or classified as postsnap, as the moment of snap. Operation 1022 may be performed by one or more hardware processors configured by machine-readable instructions including a module that is the same as or similar to the moment of snap assigning module 924, in accordance with one or more implementations.

Figure 10D:
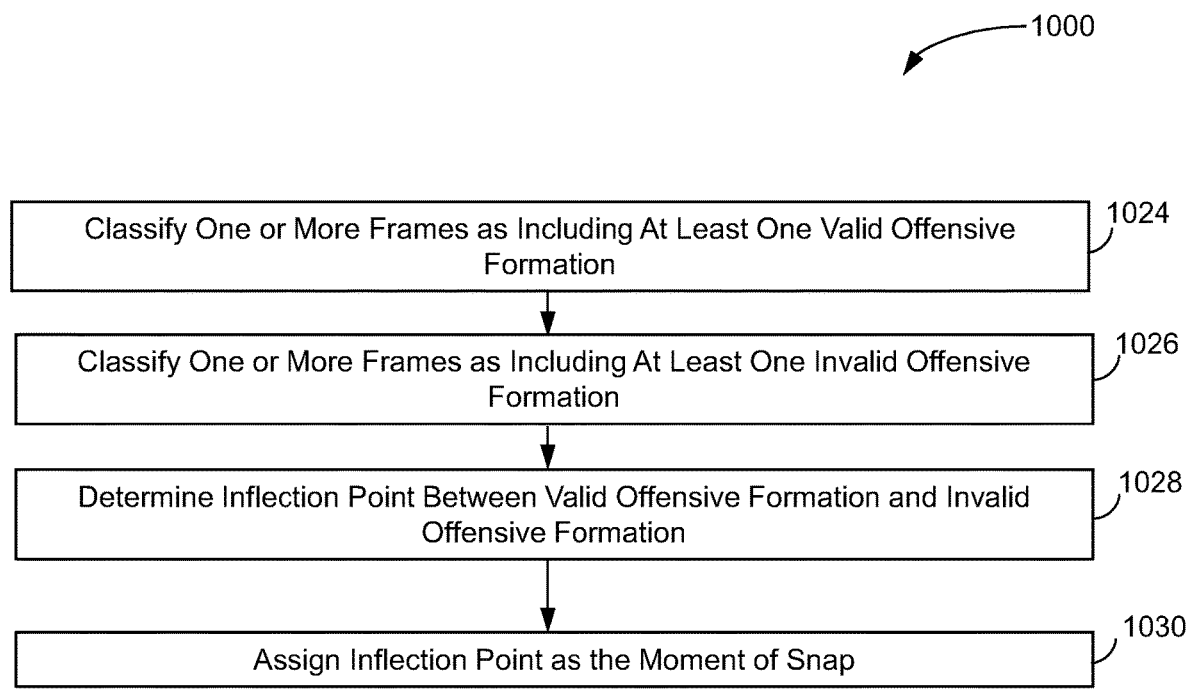

FIG. 10D illustrates method 1000, in accordance with one or more implementations. An operation 1024 may include classifying, using a neural network or machine-learning model, one or more frames of input video as including at least one valid offensive formation. The neural network or machine-learning model may be configured to identify a valid offensive formation within one or more frame of input video. In some aspects, the neural network or machine-learning model may be trained to identify any possible valid offensive formation having 11 players. Input video may include video that has been unviewed by the system and/or includes no annotations. Operation 1024 may be performed by one or more hardware processors configured by machine-readable instructions including a module that is the same as or similar to classification module 920, in accordance with one or more implementations.

An operation 1026 may include classifying, using a neural network or machine-learning model, one or more frames of input video as NOT including at least one valid offensive formation or as including an invalid offensive formation. The neural network or machine-learning model may be configured to identify the absence of a valid offensive formation within one or more frame of input video. Operation 1026 may be performed by one or more hardware processors configured by machine-readable instructions including a module that is the same as or similar to classification module 920, in accordance with one or more implementations.

An operation 1028 may include determining an inflection point, or change between, frames labeled or classified as having a valid offensive formation and frames NOT having a valid offensive formation. Operation 1028 may be performed by one or more hardware processors configured by machine-readable instructions including a module that is the same as or similar to classification module 920 or moment of snap assigning module 924, in accordance with one or more implementations.

An operation 1030 may include assigning the inflection point, or change between, frames labeled or classified as having a valid offensive formation and frames NOT having a valid offensive formation, as the moment of snap. Operation 1030 may be performed by one or more hardware processors configured by machine-readable instructions including a module that is the same as or similar to the moment of snap assigning module 924, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

What is claimed is:

1. A system for identifying a moment of snap, comprising:
   one or more processor configured by machine-readable instructions for:
   training a machine-learning model on annotated football video datasets to visually detect one or more essential Offensive formation elements;
   identifying, using the trained machine-learning model, one or more essential Offensive formation elements within a sequence of video frames;
   determining, in real-time, one or more video frames in in which one or more essential Offensive formation elements are identified, establishing a valid Offensive formation, wherein the valid Offensive formation is recognized in accordance with American Football rules;
   continuously analyzing spatial and temporal transitions of the Offensive formation across consecutive video frames: determining, in real-time, an inflection point corresponding to a disbanding of an established valid Offensive formation, wherein the disbanding is identified at least in part by detecting that a Center is transferring the ball to a Quarterback or other backfield player, and wherein the disbanding signifies the initiation of active play;

wherein identifying the moment of snap does not rely on any external sensor data, scoreboard signals, preset time-based interval, or other external event trigger apart from the video data;

and generating an annotated timestamp corresponding to the determined moment of snap.

2. The system of claim 1, wherein the one or more essential Offensive formation element includes one or more Center, one or more linemen, and one or more backfield, wherein a valid Offensive formation further requires at least seven Offensive players positioned on a line of scrimmage, including the Center, and at least one Quarterback or backfield player, and no more than one Offensive player may be in motion just prior to the snap.

3. The system of claim 1, wherein the one or more processor is further configured by machine-readable instructions for:

assigning the one or more video frame in which the valid formation disbands as a moment of snap.

4. The system of claim 3, wherein the one or more processor is further configured by machine-readable instructions for:

identifying a final pre-snap formation and alignment.

5. The system of claim 1, wherein the trained machine-learning model includes a moment of snap estimation model.

6. The system of claim 5, wherein the moment of snap estimation model is updated every N video frame of input video to account for variations in panning, zooming, and lighting.

7. The system of claim 6, wherein N is 1 or less.

8. The system of claim 1, wherein the one or more processor is further configured by machine-readable instructions for:

ignoring pre-snap motion from eligible receivers.

9. The system of claim 1, wherein training a machine-learning model includes annotating essential Offensive formation elements on samples of video.

10. A method for identifying a moment of snap within video, comprising:

obtaining sets of football video information, wherein individual ones of the sets of football video information reflect gameplay;

training a machine-learning model with the obtained sets of football video information to visually detect elements of an Offensive formation within input video; and storing the trained machine-learning model; analyzing a sequence of video frames using the trained machine-learning model to detect transitions in Offensive formations determining, in real-time, an inflection point corresponding to a disbanding of an established valid Offensive formation, wherein the disbanding is identified at least in part by detecting that a Center is transferring the ball to a Quarterback or other backfield player, and wherein the disbanding signifies the initiation of active play;

wherein identifying the moment of snap does not rely on any external sensor data, scoreboard signals, preset time-based interval, or other external event trigger apart from the video data;

and assigning a precise moment of snap based on the detected transition of a valid Offensive formation to an invalid Offensive formation and generating an output timestamp for annotation purposes.

11. The method of claim 10, wherein the elements include one or more Center, one or more Offensive linemen, and one or more backfield.

12. The method of claim 10, further comprising:

determining, using the machine-learning model, a frame of the input video in which a valid Offensive formation is formed.

13. The method of claim 12, further comprising:

determining, using the machine-learning model, a frame of the input video in which the valid Offensive formation is disbanded, wherein disbanding is identified at least in part by detecting that the Center is transferring the football to a Quarterback or other backfield player.

14. The method of claim 13, further comprising:

assigning the frame of the input video in which the valid formation is disbanded as the moment of snap.

15. The method of claim 10, wherein training the machine-learning model includes annotating the sets of football video information.

16. The method of claim 10, wherein the machine-learning model is updated every N video frame of the input video to account for variations in panning, zooming, and lighting.

17. The method of claim 16, wherein N is 1 or less.

18. The method of claim 16, wherein the machine-learning model ignores motion from eligible receivers.

19. A method for identifying a moment of snap within video according to claim 10, comprising:

obtaining sets of football video information, wherein individual ones of the sets of football video information reflect gameplay;

training a machine-learning model with the obtained sets of football video information that classifies one or more frame of input video; and storing the trained machine-learning model.

20. The method of claim 19, wherein the machine-learning model classifies the one or more frame of input video as presnap or postsnap.

21. The method of claim 20, further comprising:

assigning an inflection point from presnap to postsnap based on detected video frames as a moment of snap.

22. The method of claim 19, wherein the machine-learning model classifies the one or more frame of input video as including a valid Offensive formation or including an invalid Offensive formation.

23. The method of claim 20, further comprising:

assigning an inflection point from valid Offensive formation to invalid Offensive formation as a moment of snap, wherein continuously analyzing spatial and temporal transitions includes comparing bounding-box coordinates for at least the Center and Offensive Linemen across consecutive frames to detect a decrease in detection continuity, and wherein the trained machine-learning model is dynamically updated in real time at least once every N frames to adapt to camera panning or zooming.

* * * * *